United States Patent [19]
McCurdy et al.

[11] Patent Number: 5,935,716
[45] Date of Patent: Aug. 10, 1999

[54] ANTI-REFLECTIVE FILMS

[75] Inventors: Richard J. McCurdy, Toledo; Michel J. Soubeyrand, Holland; Ronald D. Goodman, Toledo, all of Ohio

[73] Assignee: Libbey-Owens-Ford Co., Toeldo, Ohio

[21] Appl. No.: 09/024,228

[22] Filed: Feb. 17, 1998

Related U.S. Application Data

[60] Provisional application No. 60/051,799, Jul. 7, 1997.
[51] Int. Cl.⁶ ..................................... B32B 17/00
[52] U.S. Cl. ........................ 428/428; 428/432; 428/701; 428/702; 359/359; 359/586
[58] Field of Search ................................ 428/428, 432, 428/701, 702; 359/359, 586

[56] References Cited

U.S. PATENT DOCUMENTS

| | | | |
|---|---|---|---|
| 5,698,262 | 12/1997 | Soubeyrand | 427/255.3 |
| 5,749,931 | 5/1998 | Goodman | 65/60.1 |
| 5,750,265 | 5/1998 | Goodman | 428/432 |
| 5,780,149 | 7/1998 | McCurdy | 428/336 |

*Primary Examiner*—Timothy M. Speer
*Attorney, Agent, or Firm*—Marshall & Melhorn

[57] ABSTRACT

An anti-reflective glass article including a glass substrate, a first coating of a metal oxide and a second coating of a metal oxide. The first coating of metal oxide is applied over the substrate. The refractive index of the first coating of metal oxide ranges from 1.8 to 2.6. The thickness of the first coating is greater than $l/(4*n)$, wherein l equals a design wavelength in the visible spectrum and n equals the refractive index of said first coating of metal oxide. The second coating of metal oxide is applied over the first coating. The second coating of metal oxide has a refractive index of about 1.45 to about 1.6 and a thickness of less than $l/4(n)$.

22 Claims, No Drawings

ANTI-REFLECTIVE FILMS

RELATED APPLICATIONS

This application is claiming the benefit, under 35 U.S.C. §119(e), of the provisional application filed Jul. 7, 1997 under 35 U.S.C. §111(b), which was granted a Ser. No. of 60/051,799. The provisional application, Ser. No. 60/051, 799, is hereby incorporated by reference.

BACKGROUND OF THE INVENTION

This invention relates to a multilayer film suitable for use as an anti-reflective coating on a glass substrate. More particularly, this invention relates to a multilayer film stack with a first layer of a metal oxide, or doped metal oxide having a high refractive index, combined with a second layer of a metal oxide having a low refractive index. The thickness of the first layer is greater than conventional ¼ wavelength anti-reflective coatings. The thickness of the second layer is less than the thickness for conventional ¼ wavelength coatings. The multilayer film is generally applied pyrolytically onto a glass substrate in a float glass production process.

Coatings on glass are commonly utilized to provide specific energy attenuation and light transmittance properties. Additionally, coatings are designed to reduce reflections from interfaces between individual coating layers and the glass when a plurality of coatings are applied onto a glass substrate. The coated articles are often utilized singularly, or in combination with other coated articles, to form a glazing.

The attributes of the resulting coated glass substrate are dependent upon the specific coatings applied to the glass substrate. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

Anti-reflective coatings on glass are utilized to reduce the surface reflection of optical components and to reduce the reflectance of an interface between optical media with different refractive indices. The reduction of visible reflection is achieved by the principle of optical interference. When light impinges on the air-film, film-film, and film-glass interfaces, a portion of the beam is reflected at each interface. By proper choice of thin film materials and thicknesses, the individual reflected light beams can destructively interfere, thereby reducing the observed visual reflectance.

Conventional two layer anti-reflective films generally follow a standard design formula to optimize the reduction of visible light from the interfaces of the coated glass substrate. The standard design parameters suggest the use of a two layer coating, of both high and low indices, with each coating having a thickness determined by $l/(4*n)$, where l is a design wavelength in the visible region, and n is the refractive index of the coating. While the coated glass substrates produced in accordance with the standard design have an effect upon the reflective properties of the glass, the individual layers require thicknesses that are often difficult to produce on-line pyrolytically on a moving ribbon of glass.

It would be advantageous to reduce reflection properties of a coated glass substrate over conventional anti-reflective films.

It would be a further advantage to provide an anti-reflective film that may be applied pyrolytically onto a glass substrate. A pyrolytic film enables the deposition of the film on-line, for example, in a float glass production process.

SUMMARY OF THE INVENTION

In accordance with the present invention, there is provided a multilayer film suitable for use as a coating on glass. The coating is utilized to produce anti-reflective glass articles.

The multilayer coating includes a first coating of a metal oxide applied over a glass substrate. The first coating of the present invention has a refractive index of 1.8 to 2.6 and a thickness greater than $l/(4*n)$, wherein 1 equals a design wavelength in the visible spectrum and n equals the refractive index of the metal oxide used for the first coating. The second coating of metal oxide is applied over the first coating. The second coating has a refractive index of about 1.45 to about 1.6 and a thickness of less than $l/4(n)$.

The coatings are preferably applied pyrolytically, on-line onto a float glass ribbon. The thicknesses and optical characteristics of the coating stack may be adjusted to achieve a broad range of specified reflectance and transmittance values. However, in a preferred embodiment, the coated glass article has a visible light transmittance of greater than 90% and a reflection of less than 6%. The transmittance of visible light is neutral in color. The reflectance of visible light is preferably neutral in color.

The present invention provides an anti-reflective film for use as a coating on a glass substrate. The multilayer film of the present invention reduces the reflection of light in comparison to conventional anti-reflective coatings. Furthermore, the film exhibits a desirable neutral color in transmittance.

Additionally, the present invention provides an anti-reflective film that can be pyrolytically deposited onto a glass substrate. The thicknesses of each layer in the present invention are better suited for on-line applications over conventional anti-reflective coatings.

DETAILED DESCRIPTION OF THE PREFERRED EMBODIMENT

In accordance with the present invention, it has been discovered that a multilayer anti-reflective film having thicknesses outside conventional standards may improve the anti-reflective and color properties of a coated glass article. The first layer of the multilayer film is a high reflective index metal oxide having a thickness greater than $l/(4*n)$, wherein l equals a design wavelength in the visible spectrum and n equals the refractive index of the metal oxide. A second coating of a low refractive index metal oxide is applied over the first coating. The second coating of metal oxide has a thickness of less than $l/4(n)$. The film exhibits a neutral color in visible light transmittance. The coated glass article is especially suitable for use with anti-reflective glass articles.

The glass substrates suitable for use in preparing the coated glass article according to the present invention may include any of the conventional clear glass compositions known in the art. The preferred substrate is a clear float glass ribbon wherein the coating of the present invention, along with other optional coatings, is applied in the heated zone of the float glass process. However, other conventional processes for applying coatings on glass substrates are suitable for use with the present inventive coating. Additionally, colored glass compositions may be utilized with the antireflective coating of the present invention to achieve specific spectral and energy attenuation properties.

The first layer of the present invention is a high refractive index film of a metal oxide or doped metal oxide. The refractive index is generally about 1.8 to about 2.6. Preferred metal oxides, or doped metal oxides, include tin oxide, titanium oxide, or fluorine doped tin oxide. However, other conventional metal oxide films that may be applied pyrolytically and have a refractive index within the specified range are suitable for use with the present invention. For example, other materials could include mixed metal oxides, oxy-nitrides, aluminum oxide, or tantalum oxide. The selection of a high refractive index material is relative to the low refractive index material utilized in the multilayer coating.

The thickness of the first layer is determined by the specific metal oxide. The thickness is greater than $1/(4*n)$, wherein l equals a design wavelength in the visible spectrum and n equals the refractive index of the metal oxide.

The second layer of the anti-reflective coating is a metal oxide having a refractive index of about 1.45 to about 1.6. Preferably, silicon oxide is utilized with the present invention. However, other metal oxides having low refractive indices are suitable for use with the present invention. The thickness of the second of the multilayer coating is less than $1/(4*n)$, with n being the refractive index of the metal oxide. The reduced thickness over conventional ¼ wavelength antireflective films results in a silicon oxide layer that is easier to apply in a float glass production process.

In accordance with the present invention, the design wavelength, l, is generally selected at the center of the visible region, or at 550 nm. Thus, the thickness of each layer is determined in accordance with the specific metal oxide. For example, a first layer of a fluorine doped tin oxide is applied to a 0.125 inch float glass ribbon. The thickness of the film is about 1000 angstroms, which would correspond to $1/(3*n)$ or 550 nm/$(3*1.82)$. The second metal oxide is a silicon oxide at about 840 angstroms thick. The thickness of the silicon oxide corresponds to $1/(4.5*n)$ or 550 nm/$(4.5*1.45)$. The resulting film exhibits a visible light transmittance of 91.5% and a reflection of 4.46%.

The present inventive coating exhibits a neutral color in transmittance. The coated article of the foregoing example has a neutral color in transmittance, as indicated by CIELAB color values, of a* -1.76 and b* 1.88. Additionally, the article exhibits a reflected color, indicated by CIELAB values, of a* 3.56 and b* -9.31. The preferred color for the present invention is a* of about 4 to -6 and b* of about 4 to about -12.

In comparison, conventional two layer anti-reflective coatings generally utilize a stack with each layer being ¼ wavelength at a 550 nm design wavelength. The layers have alternating high and low refractive indices. An example would include a fluorine doped tin oxide layer of about 705 angstroms thick on a 0.125 inch glass substrate with a silicon oxide layer of about 948 angstroms thick applied over the tin oxide layer. The resulting coated articles exhibits a visible light transmittance of 92% and a visible reflection of 4.6%. The article has transmitted color values of a* -2.14 and b* 2.64 with a reflected color of a* -6.5 and b* -13.1. Thus, the coating of the present invention results in improved reflection and a preferred more neutral color compared to conventional anti-reflective coatings.

For a pyrolytic deposition, the metal oxides or doped metal oxides of the present invention are deposited onto the glass substrate through the use of conventional deposition precursors. An example of a fluorine doped tin oxide would include the use of a fluorine source, vaporized and injected into a precursor gas stream containing dimethyltin dichloride, oxygen, and water in a helium carrier gas.

The coating of the present invention may be utilized as an anti-reflective coating to reduce the visible reflection by the principle of optical interference. Thus, the present inventive coating may reduce visible reflections below 6%, and preferably below 5%.

Additionally, a barrier layer may be applied to the glass prior to the application of the first metal oxide layer. Barrier layers are utilized to prevent the migration of alkali metal ions from the glass substrate into the film. The migration of the alkali metal ions reduces the quality of the coated glass article and results in the undesirable appearance of haze in the article. A barrier layer is generally applied at about 100–200 angstroms thick. A preferable material for the barrier layer is silicon oxide.

The anti-reflective coated glass article is ideally suited for use in various architectural and automotive applications where high reflectivity is undesirable.

The following example, which constitutes the best mode presently contemplated by the inventors for practicing the present invention, is presented solely for the purpose of further illustrating and disclosing the present invention, and is not to be construed as a limitation on, the invention:

EXAMPLE

A float glass process was used to produce a clear float glass ribbon having a thickness of 0.125 inches. The glass ribbon was traveling at a line speed of about 433 inches per minute. A conventional coating apparatus is utilized in the float bath to apply a 185 angstrom coating of silicon oxide onto the surface of the float glass ribbon. The coating was applied by directing 12 standard liters per minute (slm) of ethylene, 6 slm of oxygen, and 2 slm of silane $SiH_4$ in 535 slm of a nitrogen carrier gas.

A 1025 angstrom coating of fluorine doped tin oxide was applied onto the silicon oxide coating. Approximately, 9 pounds per hour of dimethyltin dichloride, 270 slm of oxygen, 6 slm of hydrofluoric acid, and 150 cc per minute of water were provided in a 200 slm helium carrier gas.

A 777 angstrom coating of silicon oxide was applied over the fluorine doped tin oxide film. The outer layer was applied by directing a precursor gas mixture, in each of two conventional coaters, containing 42 slm of ethylene, 21 slm of oxygen, and 7 slm of silane $SiH_4$ in a 535 slm of a nitrogen carrier gas.

The back surface of the resulting coated glass article was polished with $CeO_2$ to eliminate back surface tin from the float bath. The coated glass article exhibited a 92.3% visible light transmittance with a neutral color in accordance with CIELAB Illuminant C 2 degree observer standard having a* value of -1.9 and b* value of 2.4. The article had a visible light reflection of 4.8 and a neutral color as designated by an a* value of 5.6 and b* value of -12.0.

In accordance with the provisions of the patent statutes, the present invention has been described in what is considered to represent its preferred embodiment. However, it should be noted that the invention can be practiced otherwise than as specifically illustrated and described without departing from its spirit and scope. For example, other coating methods, such as sputtering, may also be utilized to form the coating of the present invention.

What is claimed is:

1. An anti-reflective glass article, comprising:
   (a) a glass substrate,
   (b) a first pyrolytic coating of a metal oxide applied over said substrate, said first coating of metal oxide having a refractive index of 1.8 to 2.6 and a thickness of greater than $l/(4*n)$ wherein l equals a design wavelength in the visible spectrum and n equals the refractive index of said first coating of metal oxide; and
   (c) a second pyrolytic coating of a metal oxide applied over said first coating, said second coating of metal oxide having a refractive index of about 1.45 to about 1.6 and a thickness of less than $l/(4*n)$.

2. An anti-reflective glass article as recited in claim 1, wherein said first coating of metal oxide is a doped metal oxide.

3. An anti-reflective glass article as recited in claim 1, wherein said first coating is fluorine doped tin oxide having a refractive index of about 1.82, and said second coating is a silicon oxide having a refractive index of about 1.45.

4. An anti-reflective glass article as recited in claim 3, wherein said first coating is applied at a thickness of about 1000 angstroms, and said second coating of metal oxide is applied at a thickness of about 840 angstroms.

5. An anti-reflective glass article as recited in claim 4, wherein said article exhibits a neutral color in transmission defined in the CIELAB system having an a* value of about −1.76 and a b* value of about 1.88.

6. An anti-reflective glass article as recited in claim 4, wherein said article exhibits a reflected color as defined in the CIELAB system having an a* value of about 3.56 and a b* value of about −9.31.

7. An anti-reflective glass article as recited in claim 1, wherein said article exhibits a neutral color in transmission and reflectance as defined in the CIELAB system having an a* value from about 4 to about −6 and a b* value of about 4 to about −12.

8. An anti-reflective glass article as recited in claim 1, further comprising a barrier layer applied between said glass substrate and said first coating of metal oxide.

9. An anti-reflective glass article as recited in claim 8, wherein said barrier layer is $SiO_2$ having a thickness of about 100 angstroms.

10. An anti-reflective glass article as recited in claim 1, wherein said glass substrate is a float glass ribbon and said coatings are deposited pyrolytically onto said float glass ribbon.

11. An anti-reflective glass article as recited in claim 1, wherein said coated article exhibits a reflectance of less than 6%.

12. An anti-reflective glass article as recited in claim 1, wherein said coated article exhibits a reflectance of less than 5%.

13. An anti-reflective glass article as recited in claim 1, wherein said article further includes a polished back surface.

14. An anti-reflective glass article, comprising:
   (a) a glass substrate,
   (b) a first coating of an oxy-nitride applied over said substrate, said first coating having a refractive index of 1.8 to 2.6 and a thickness of greater than $l/(4*n)$ wherein l equals a design wavelength in the visible spectrum and n equals the refractive index of said first coating of oxy-nitride; and
   (c) a second coating of a metal oxide applied over said first coating, said second coating of metal oxide having a refractive index of about 1.45 to about 1.6 and a thickness of less than $l/(4*n)$.

15. An anti-reflective glass article, comprising:
   (a) a glass substrate,
   (b) a first coating of silicon oxide applied over said substrate,
   (c) a second coating of fluorine doped tin oxide applied over said first coating, said second coating of fluorine doped tin oxide having a refractive index of 1.8 to 2.6 and a thickness of greater than $l/(4*n)$ wherein l equals a design wavelength in the visible spectrum and n equals the refractive index of said second coating of fluorine doped tin oxide; and
   (d) a third coating of a silicon oxide applied over said second coating, said third coating of silicon oxide having a refractive index of about 1.45 to about 1.6 and a thickness of less than $l/(4*n)$.

16. An anti-reflective glass article as recited in claim 15, wherein said article further includes a polished back surface.

17. An anti-reflective glass article as recited in claim 15, wherein said first coating of silicon oxide has a thickness of about 185 angstroms.

18. An anti-reflective glass article as recited in claim 15, wherein said second coating of fluorine doped tin oxide has a thickness of about 1025 angstroms.

19. An anti-reflective glass article as recited in claim 15, wherein said third coating of silicon oxide has a thickness of about 777 angstroms.

20. An anti-reflective glass article as recited in claim 15, wherein said article exhibits a neutral color in transmission defined in the CIELAB system having an a* value of about −1.9 and a b* value of about 2.4.

21. An anti-reflective glass article as recited in claim 15, wherein said article exhibits a neutral color in reflectance defined in the CIELAB system having an a* value of about 5.6 and a b* value of about 12.0.

22. An anti-reflective glass article, comprising:
   (a) a glass substrate,
   (b) a first coating of a metal oxide applied over said substrate, said first coating of metal oxide having a refractive index of 1.8 to 2.6 and a thickness of greater than $l/(4*n)$ wherein l equals a design wavelength in the visible spectrum and n equals the refractive index of said first coating of metal oxide; and
   (c) a second coating of a metal oxide applied over said first coating, said second coating of metal oxide having a refractive index of about 1.45 to about 1.6 and a thickness of less than $l/(4*n)$, wherein n equals the refractive index of said second coating of metal oxide and said glass article exhibits a reflectance of less than 6% and a visible light transmittance of greater than 90%.

* * * * *